United States Patent [19]
Itoh et al.

[11] Patent Number: 5,623,300
[45] Date of Patent: Apr. 22, 1997

[54] PRINT HEAD WITH LIGHT-EMITTING ELEMENT DRIVING CORRECTION

[75] Inventors: Tetsuya Itoh, Okazaki; Munehiro Nakatani, Toyohashi; Nobuo Kamei, Toyokawa, all of Japan

[73] Assignee: Minolta Camera Kabushiki Kaisha, Osaka, Japan

[21] Appl. No.: 100,168

[22] Filed: Aug. 2, 1993

[30] Foreign Application Priority Data

Aug. 4, 1992 [JP] Japan .................... 4-207875

[51] Int. Cl.⁶ .................. B41J 2/435; B41J 2/45; B41J 2/47
[52] U.S. Cl. .......................... 347/237; 347/240
[58] Field of Search ................ 346/107 R, 154, 346/160; 358/296, 298, 302; 348/800, 801; 345/74, 82; 347/237, 132, 240, 131

[56] References Cited

U.S. PATENT DOCUMENTS

| | | | |
|---|---|---|---|
| 4,074,319 | 2/1978 | Goldschmidt et al. | 358/302 X |
| 4,368,491 | 1/1983 | Saito | 358/298 |
| 4,575,765 | 3/1986 | Hirt | 348/800 |
| 4,712,116 | 12/1987 | Reinten | 347/237 |
| 4,952,949 | 8/1990 | Uebbing | 347/237 |
| 5,241,324 | 8/1993 | Tamura et al. | 347/240 |

FOREIGN PATENT DOCUMENTS

| | | | |
|---|---|---|---|
| 60-132775 | 7/1985 | Japan | 346/139 R |
| 1-180577 | 7/1989 | Japan | |
| 1-258965 | 10/1989 | Japan | |

OTHER PUBLICATIONS

Cannon, Don. L and Luecke, Gerald, *Understanding Communications Systems*, Texas Instruments, 1980. p. 3–2.

Primary Examiner—Benjamin R. Fuller
Assistant Examiner—David Yockey
Attorney, Agent, or Firm—Burns, Doane, Swecker & Mathis, LLP

[57] ABSTRACT

A print head for reproducing a multi-level image is an provided. In the print head, a light-emitting array comprises a linear line of light-emitting elements. A D/A converter converts a multi-level image data to an analog signal, and an analog shift register shifts and latches the analog signals of a line received from the D/A converter. An analog latch register latches the analog signals held by the analog shift register. A driver controls the quantity of light of the light-emitting elements according to the analog signals latched by the analog latch register. In one embodiment, the print head includes a second analog shift register, an A/D converter a line memory and a divider which divides the image data by a signal from the line memory to produce corrected data which is provided to the driver to control driving of the light-emitting elements. In another embodiment, the print head includes an amplifier and a gain correction circuit having a sample and hold circuit from which the driver receives signals to control driving of the light-emitting elements.

4 Claims, 18 Drawing Sheets

Fig. 19(a)
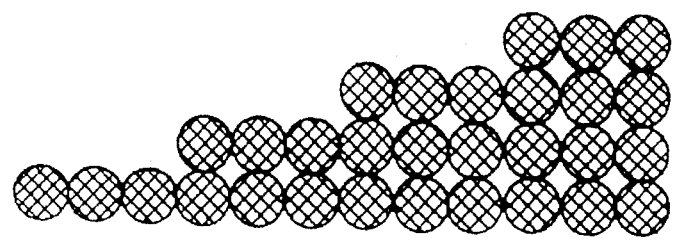
Fig. 19(b-1)
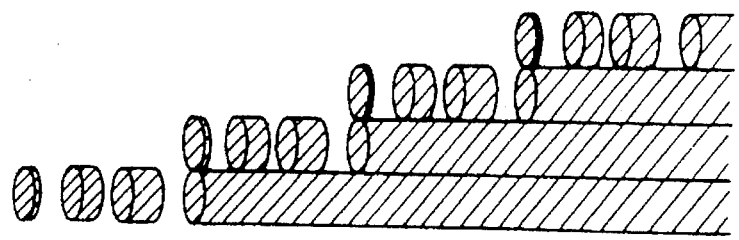
Fig. 19(b-2)
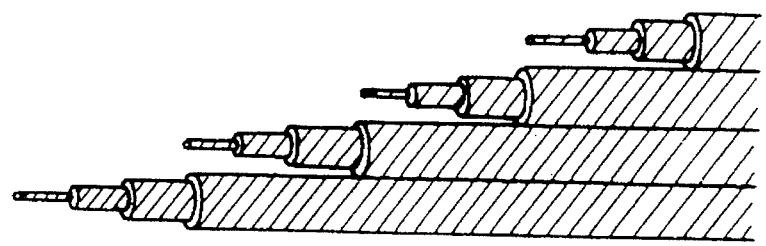
Fig. 19(c)
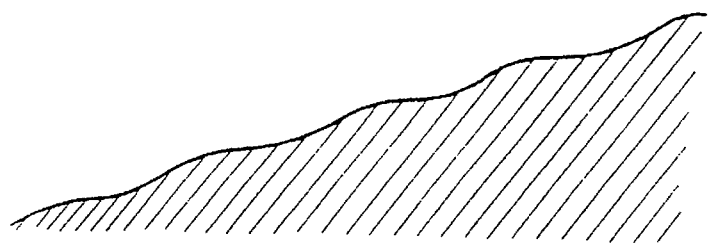

PRINT HEAD WITH LIGHT-EMITTING ELEMENT DRIVING CORRECTION

BACKGROUND OF THE INVENTION

1. Field of the Invention

The present invention relates to a print head of solid state scan type or a print head comprising a linear line of light-emitting elements such as an LED print head.

2. Description of the Prior Art

A print head which is used most at present uses a laser diode and a rotating polygon mirror. A laser beam generated by the laser diode is reflected by the polygon mirror to scan a photoconductor in the main scan direction. However, such a print head has problems such as vibrations and noises due to the rotation of the polygon mirror. As a whole, a print head of solid state scan type or with light-emitting elements aligned linearly, such as an LED head, is more appropriate because of no mechanical scan and a small size thereof.

Previously, a print head of solid state scan type such as an LED head is used to control the turn on/off of laser beams of the LED elements in the unit of a bit according to a bi-level image data so as to print a bi-level image. In other words, because the print head of solid state scan type controls the turn on/off of beams in the unit of a bit, it cannot express a half-tone image.

Then, it is suggested to modulate a beam intensity (driving current) or to modulate a driving time (pulse width) in order to express a multi-level image with an LED print head (refer Japanese Patent laid open Publications 1-180577/1989 and 1-258965/1989). The modulation can express a multi-level image of image data up to about four bits while correcting the scattering of the characteristics of each light-emitting element. However, it is difficult to express a multi-level image of image data of eight bits or more due to the circuit area size and the cost.

SUMMARY OF THE INVENTION

An object of the present invention is to provide an print head of solid state scan type which can express a half-tone image.

In one aspect of a print head of the present invention, light-emitting elements of a linear line is provided as a light-emitting array. A D/A converter converts a multi-level digital image data received in the unit of pixel to an analog signal. An analog shift register shifts the analog signals received from the D/A converter in the unit of pixel and registers data of a line. A line of analog signals shifted by the analog shift register is sent in parallel simultaneously to an analog latch register, and a driver drives the light-emitting elements in the light-emitting array according to the analog signals of a line received from the analog latch register. Preferably, an amplifier is arranged between the D/A converter and the analog shift register. Further, the analog latch register may be a second analog shift register.

In a second aspect of a print head of the present invention, the scattering of the gain of the analog shift register is corrected. A first analog shift register shifts the analog signals of image data received through a D/A converter, while a second analog shift register shifts analog signals of a line held by the first analog shift register. An A/D converter converts the serial shift output of the second analog shift register to a digital signal when a standard value is inputted to the D/A converter before recording an image, and a line memory stores a line of digital signals received from the A/D converter. Further, a divider divides receive digital image data with a digital signal or a correction data stored in the line memory. Thus, the scattering of image data is corrected. Then, the corrected data is sent through the D/A converter to the analog shift register. Then, a driver drives a light-emitting array according to the corrected data.

In a third aspect of a print head of the present invention, the scattering of the gain of the analog shift register is corrected in a different way. That is, the output of the analog shift register is amplified by an amplifier and the amplified value is held by an analog latch register. A gain correction circuit is connected to the amplifier in parallel. Before processing image data, a standard voltage is inputted in a D/A converter and then sent to the analog shift register. The output voltage of the analog shift register is sampled by a sample and hold circuit provided in the gain correction circuit. Then, the gain of the amplifier is controlled so that the output becomes constant for the same standard voltage for each pixel in a line. Thus, the scattering of the gain can be corrected automatically for image data according to the signal held by the sample and hold circuit.

An advantage of the present invention is that analog voltage levels of a line for multi-level data of images can be outputted simultaneously by using an analog shift register for a print head.

Another advantage of the present invention is that the intensity or driving time of optical output of each element in a print head can be controlled easily for a multi-level output.

A further advantage of the present invention is that transfer loss or scattering of data due to the shift and latch of an analog shift register can be corrected easily so that a correct analog output can be obtained from input image data.

A still further advantage of the present invention is that an image of high quality can be obtained by smoothing an edge in an image.

BRIEF DESCRIPTION OF THE DRAWINGS

These and other objects and features of the present invention will become clear from the following description taken in conjunction with the preferred embodiments thereof with reference to the accompanying drawings, and in which:

FIGS. 19(a), 19(b-1), 19(b-2) and 19(c) are diagrams of a situation in pulse width modulation and in intensity modulation;

DETAILED DESCRIPTION OF THE PREFERRED EMBODIMENTS

Figure 1:
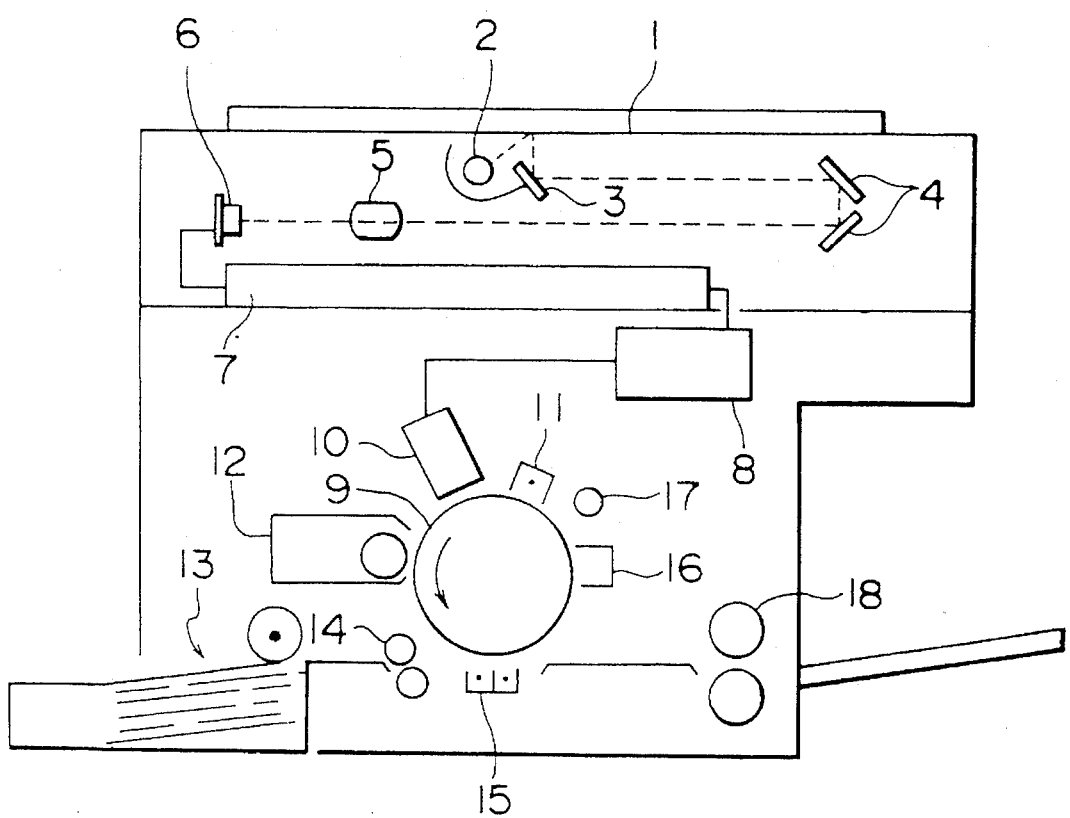
FIG. 1 is a sectional view of a copying machine with an LED head.

Referring now to the drawings, wherein like reference characters designate like or corresponding parts throughout the several views, embodiments of the present invention is explained below.

First Embodiment

FIG. 1 shows a copying machine with a print head of solid state scan type. In an image read section, a document put on a platen 1 is illuminated by an exposure lamp 2. The light reflected from the document propagates through mirrors 3, 4 and a lens 5 and forms an image onto a linear CCD sensor 6, which converts the optical image to an electrical analog signal. The analog signal is processed by an image processing block 7 for A/D conversion, shading correction, filtering, magnification and the like and the processed data is sent to a control block 8 of an image-forming section as an 8-bit digital image data.

In the control block 8, the image data is processed for various kinds of corrections according to the sensitivity and the development characteristic of a photoconductor 9, and then it is sent to an LED print head 10 serially. Further, the control block 8 controls image-forming or electrophotographic process (including paper feed). First, the photoconductor 9 is sensitized uniformly by a sensitizing charger 11. Next, the optical intensity of each LED element in the LED print head 10 is modulated according to the image data, and the photoconductor 9 is exposed with the LED print head 10 to form a latent image. Then, the latent image is developed with a development unit 12 to form a toner image on the photoconductor 9. On the other hand, a paper fed from a cassette 13 is sent to a transfer section by timing rollers 14 in synchronization with the toner image, and the toner image is transferred to the paper by a transfer charger 15. Next, the toner image is fixed thermally by a fixing unit 18. On the other hand, toners not transferred onto the paper are recovered by a cleaner 16 and residual charges on the photoconductor 9 are erased with an eraser lamp 17.

The LED print head 10 comprises LED elements aligned linearly and exposes the photoconductor for each line, and its basic action is similar to that used for an ordinary LED print head in an electrophotographic copying machine. The LED print head 10 used in this embodiment has a length of 120 mm (A4 size) and a density of 16 dots/mm. Thus, the total pixel number is 210×16=3,360.

Figure 2:
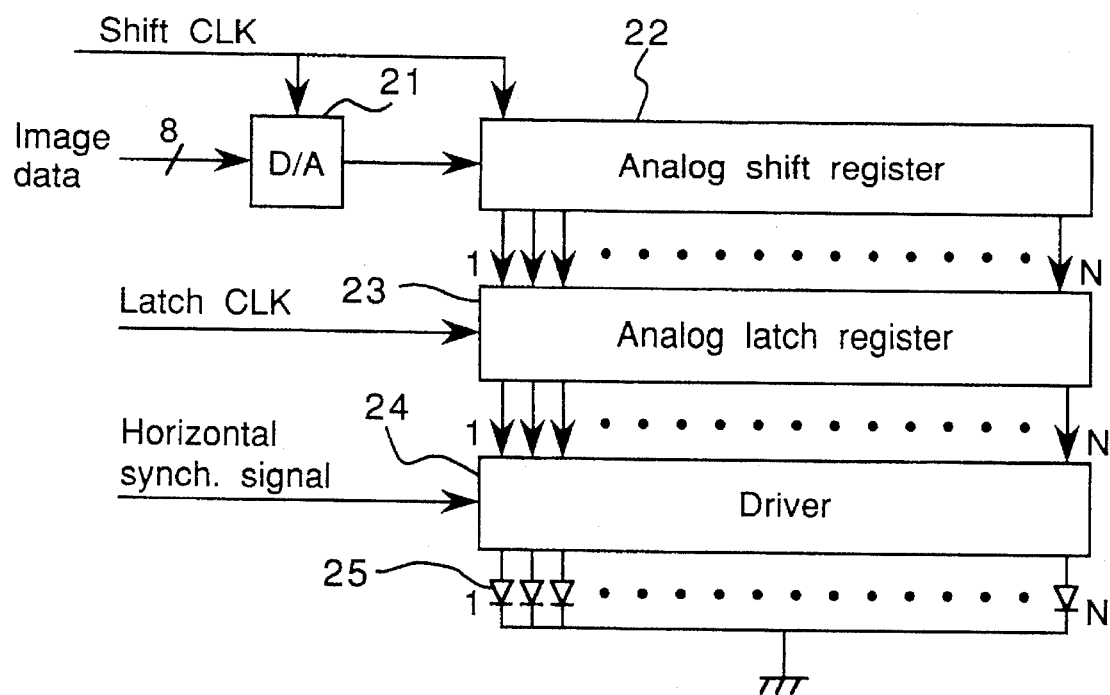
FIG. 2 is a block diagram of an LED print head.

FIG. 2 shows the LED print head 10 wherein a D/A converter 21 converts a multi-level digital image data to an analog signal for each pixel. An analog shift register 22 shifts the analog signals according to shift clocks and registers them in the unit of pixel. The analog shift register 22 comprises charge-coupled device (CCD) elements of the number of pixels in a horizontal line. However, it may also comprise bucket brigade device (BBD) elements or the like. An analog latch register 23 receives and latches a line of analog signals registered in the analog shift register 22 in synchronization with a latch clock. A driver 24 drives an LED array 25 according to the analog signals for the pixels in synchronization with a horizontal synchronization signal and drives the LED elements in the LED array 25. The LED array 25 is driven according to the data of a line latched by the analog latch register 23 while the analog shift register 22 receives successively image data of a line. The driver 24 controls the quantity of light by changing the optical intensity.

In this embodiment, the analog shift register 22 receives image data of a horizontal line successively while the driver 24 drives the LED array 25 according to the data latched in the analog latch register 23. However, in a modified example, the analog latch register 23 may be omitted. In this case, the image data are processed in the unit of horizontal line. That is, after image data of a line is completed to be driven by the driver 24, image data of the next line is supplied to the analog shift register 22.

Figure 3:
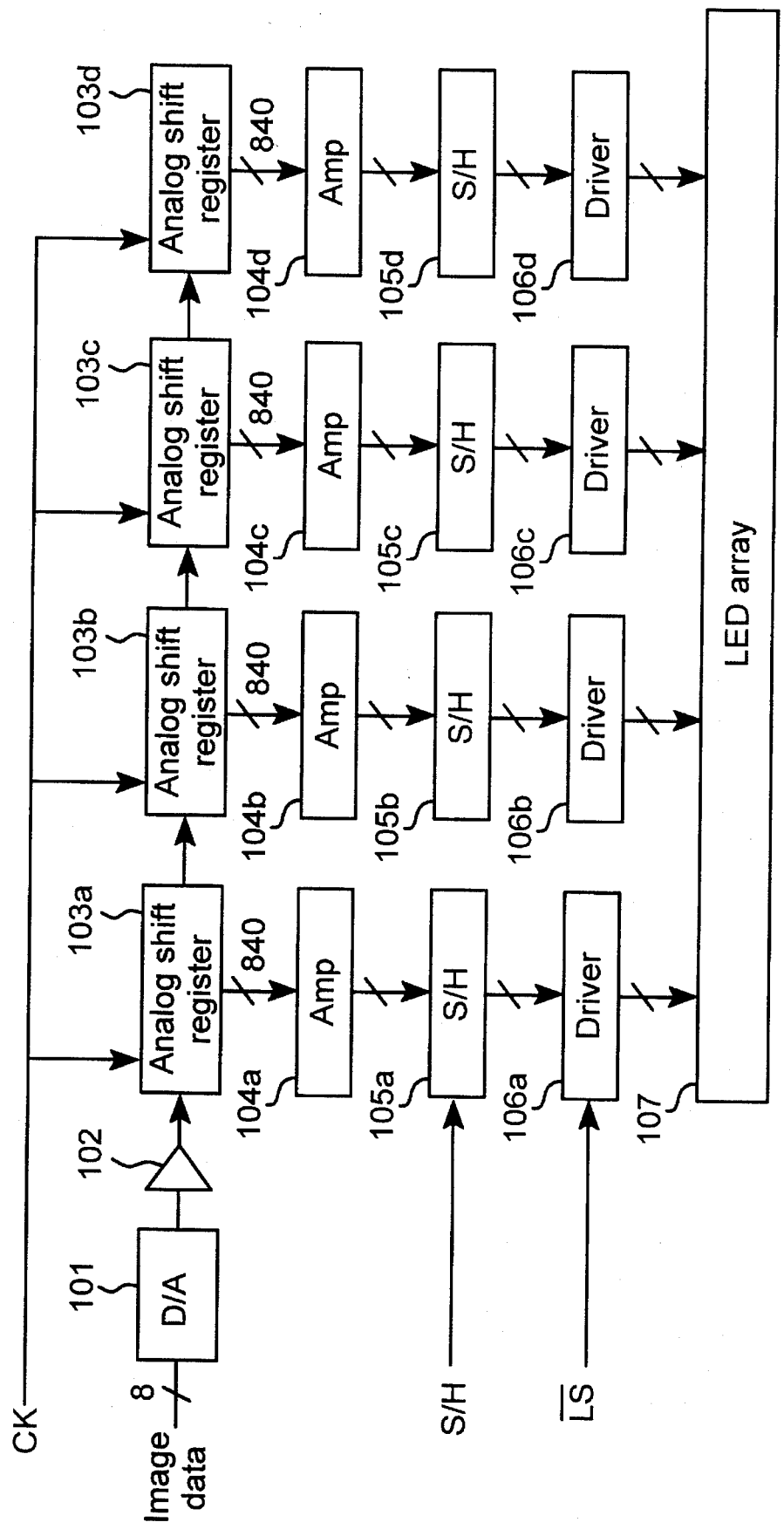
FIG. 3 is a block diagram of an LED print head of a first embodiment.

FIG. 3 shows the LED print head 10 more concretely. Multi-level image data (8-bit/pixel) received serially from the control block 8 are converted to analog signal by a D/A converter 101. The analog signal is amplified next by an amplifier 102 and is sent to four analog shift registers 103a–103d connected with each other serially and each comprising 40 bits. Therefore, the analog shift registers 103a14 103d can register data of a line of 840×4=3,360. Each analog shift register 103a–103d comprises CCD elements or the like and shifts an analog signal at a pixel to a next adjacent pixel serially in synchronization with clock signals CK. Each analog shift register 103a–103d sends data to the amplifier 104a–104d in parallel, and sends a signal shifted by 840 bits to the next analog shift register.

Each parallel outputs of the analog shift registers 103a–103d are amplified by the amplifiers 104a–104d and are held by sample and hold circuits 105a–105d for each line according to the high level of an S/H signal for sampling image data (analog signals). The sample and hold circuits 105a–105d hold the data of a line until the S/H signal becomes low level and becomes high level again.

Next, the drivers 106a–106d drive an LED array 107 according to the signals held by the sample and hold circuits 105a–105d in synchronization with an LS signal (horizontal synchronization signal) so as to expose a line with 3,360 pixels on the photoconductor. The LS signal is generated to designate the light-emission timing and the light-emitting time for each line, and the drivers 106a–106d drive the LED array 107 with currents according to the data held by the sample and hold circuits 105a–105d. In this embodiment, the numbers of the analog shift registers and the like are four to form a line of 3,360 pixels. However, it may be an appropriate number in correspondence to the number of the pixels of a line.

Figure 4:
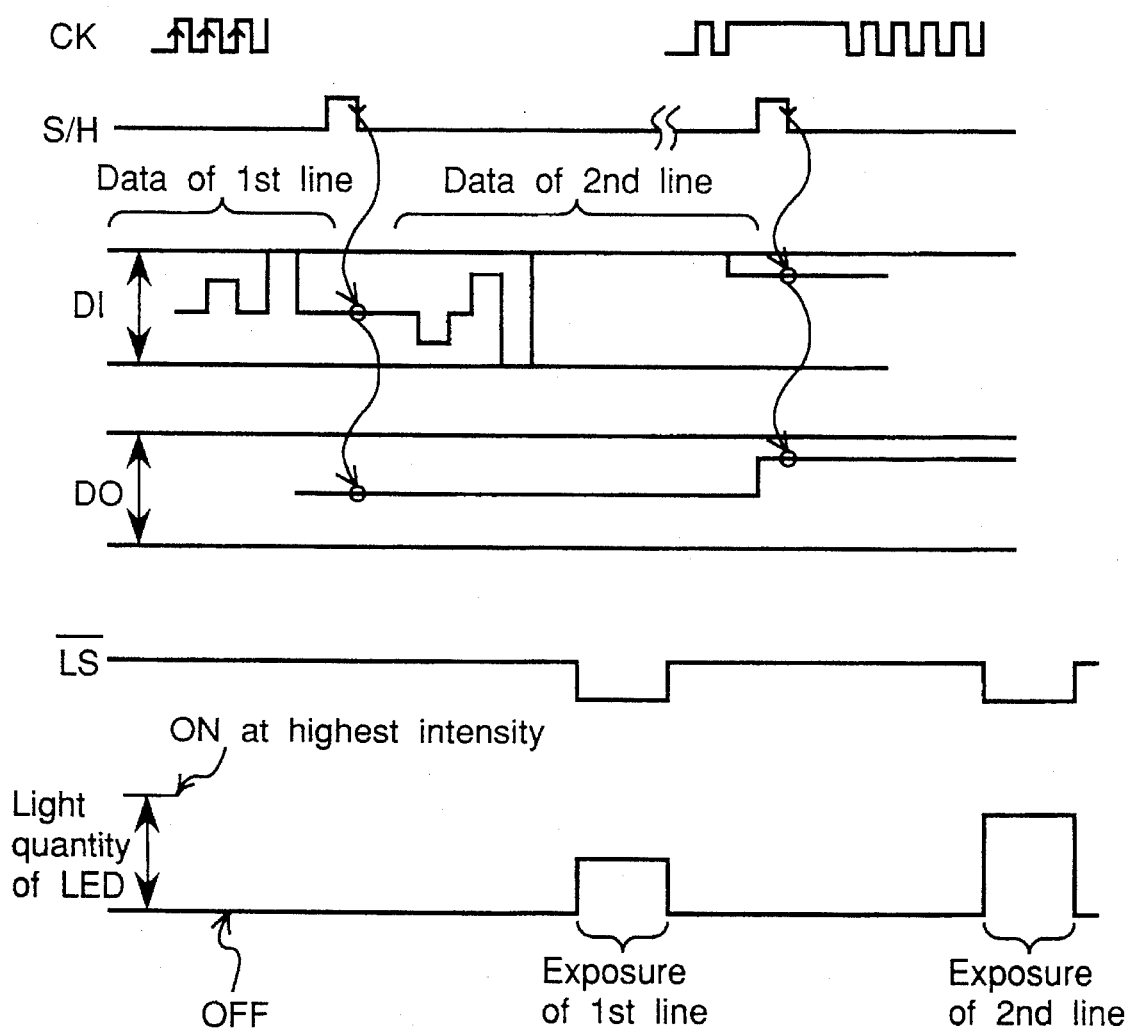
FIG. 4 is a timing chart of data processing in the print head.

FIG. 4 illustrates timings of data processing in the print head 10, wherein "DI" and "DO" denote input and output signals for an element in the sample and hold circuits 105a–105d. The input signal "DI" changes at each clock signal as the data are shifted in the analog shift registers 103a–103d. When data of a line are shifted in the analog shift registers 103a–103d, the S/H signal "LS" becomes the high level to sample and hold the input signal "DI" at the time, or the input signal "DI" at the time is outputted as the output signal "DO" Next, if the S/H signal "LS" becomes the low level, the drivers 106a–106d let relevant LED elements emit a light beam according to the output signals "DO". Thus, data of a line is outputted, and the processing of a next line starts.

In this embodiment, the light emission intensity of the LED elements is modulated while a period when the LS signal becomes the low level is constant. The exposure energy can be controlled more finely by modulating the light emission time further.

Figure 5:
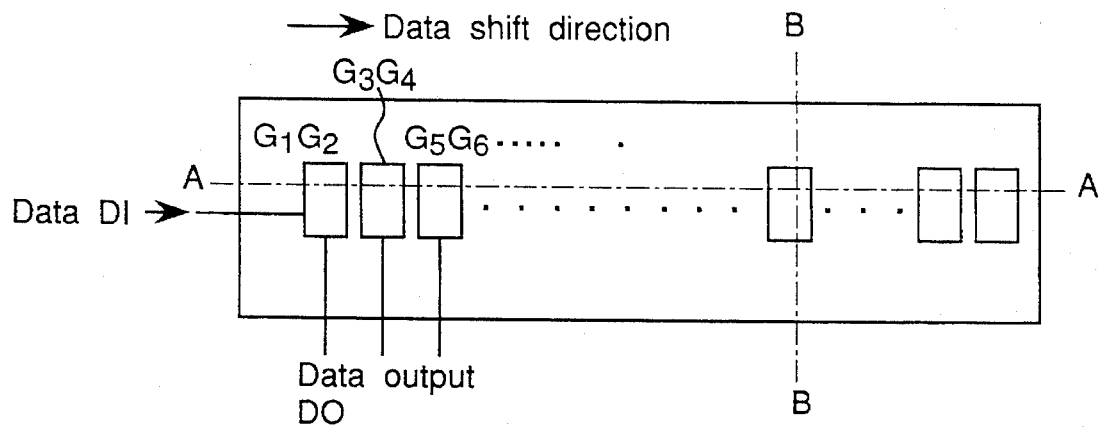
FIG. 5 is a schematic diagram of an analog shift register.
Figure 6:
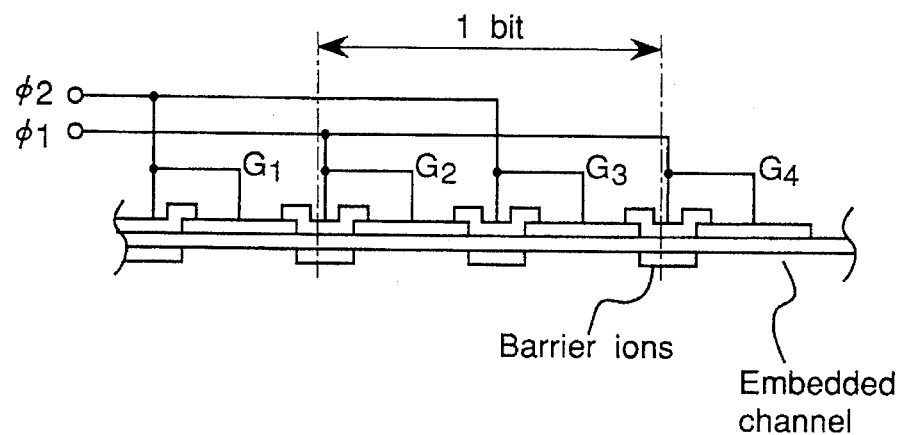
FIG. 6 is a sectional view at A—A line in FIG. 5.
Figure 7:
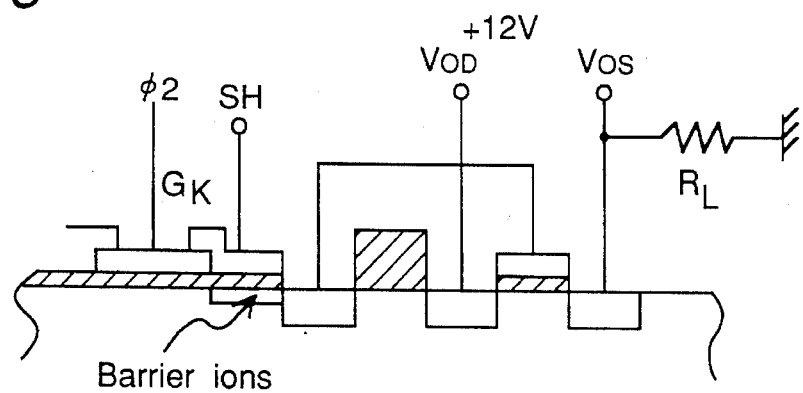
FIG. 7 is a sectional view at B—B line in FIG. 5.
Figure 8:
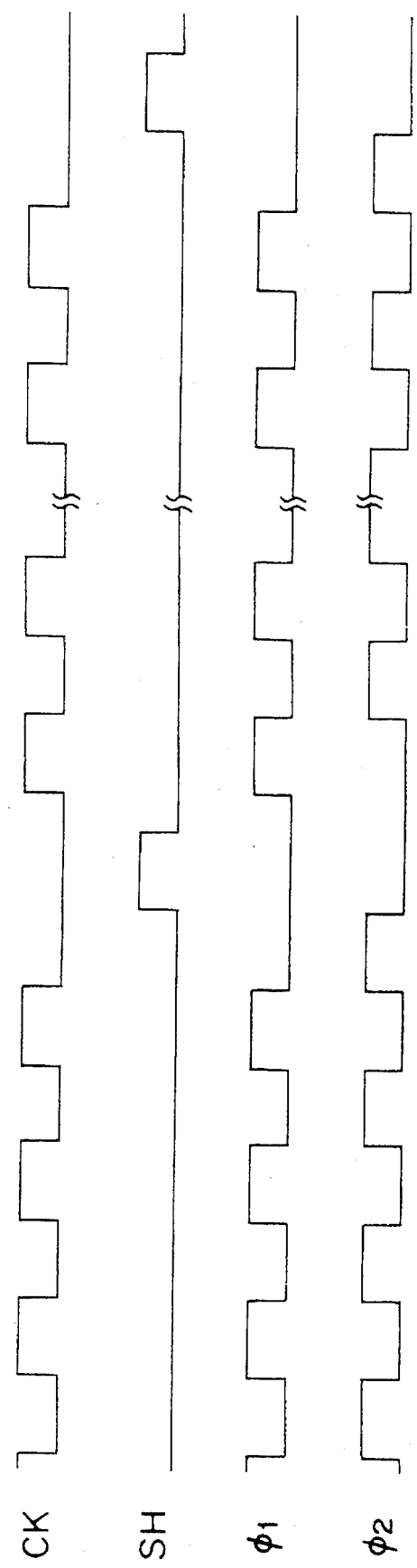
FIG. 8 is a timing chart of clock signals CK, $\phi 1$, $\phi 2$ and a sample-hold signal SH.

Next, the analog shift registers 103a–103d is explained. FIG. 5 shows a structure of the analog shift register 103a–103d comprising CCD elements, while FIG. 6 shows a partial section in A—A direction (data shift direction) in FIG. 5. Because a CCD element is difficult to be represented in a circuit diagram, it is shown in the sectional view. Each bit comprises two gates G1 and G2; G3 and G4; and the like, and the bits are aligned linearly in the data shift direction. The structure of a bit is similar to a prior art CCD element. The input data "DI" are shifted serially, while the output data "DO" are outputted in parallel. Reference numeral φ1 and φ2 denote clock signals. The clock signal φ1 is supplied to the gates G2, G4, and so on, and the clock signal φ2 is supplied to the gates G1, G3 and so on. FIG. 7 shows a partial sectional view along B—B direction (output direction) in FIG. 5. A data output terminal Vos is connected only to the gates G1, G3 and so on for the clock φ2. In the right-most part of the array in FIG. 5 which is to be connected to the input of the next analog shift register, the high level (+5 V) is supplied instead of the SH signal. The clock signals CK, φ1, φ2 and the sample and hold signal SH have a relation illustrated in FIG. 8.

Figure 9:
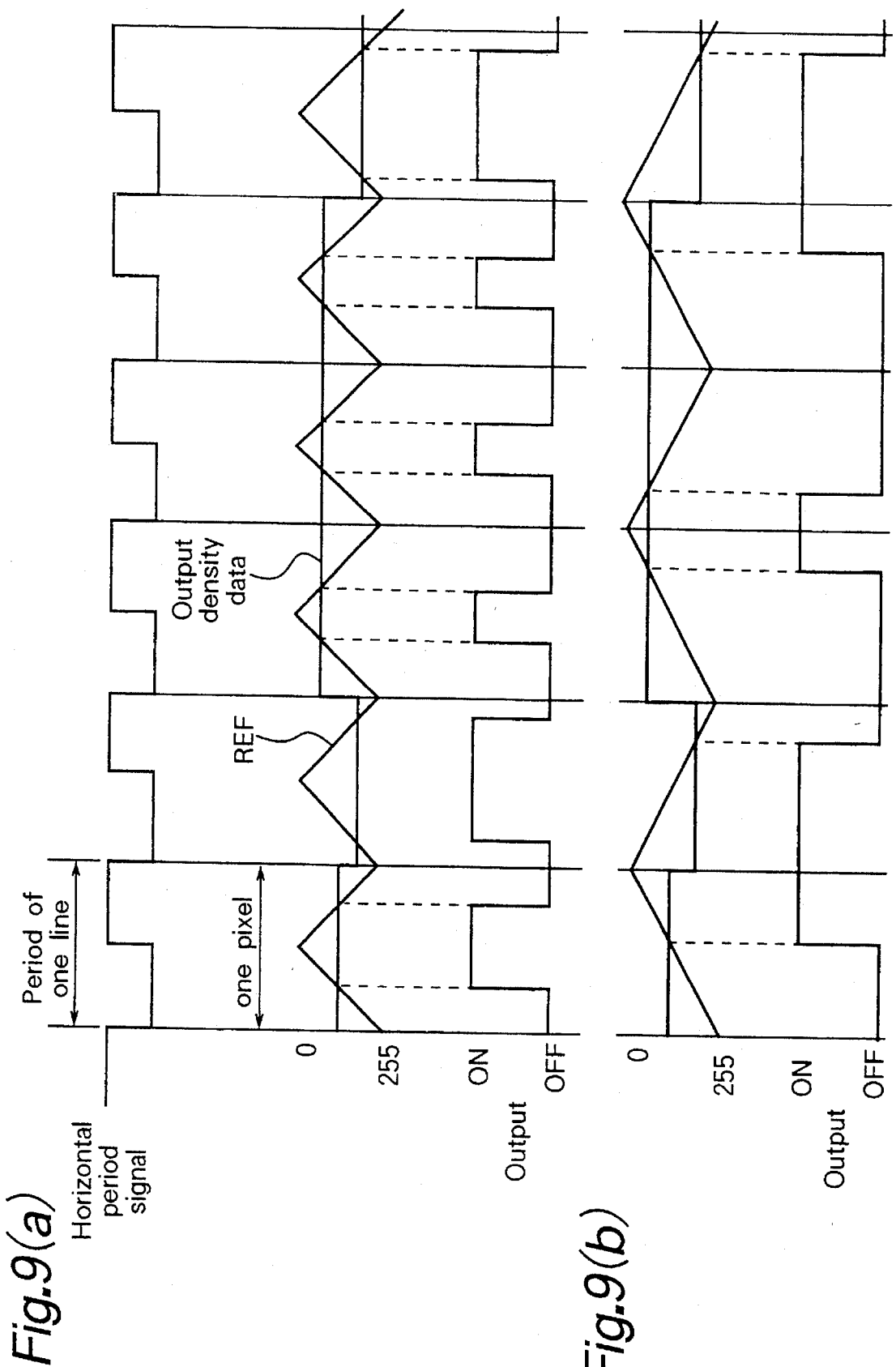
FIGS. 9(a) and 9(b) are timing charts in pulse width modulation for a period of one dot and of two dots.

In the above-mentioned embodiment, the LED signal is controlled so that the light emission intensity is modulated according to the analog signal. However, as shown in a timing chart on a pixel in FIGS. 9(a) and 9(b), the pulse width may be modulated according to the analog signal under a constant light emission intensity. In this case, a driver 24 controls the quantity of light by changing the light emission time according to the analog signal. The pulse modulation may be performed in the unit of a dot (FIG. 9(a)) or two dots (FIG. 9(b)). The output density data is compared with a reference signal (REF) generated in the unit of a period of a dot or two dots, and the LED element emits light when the output density data is larger than the reference signal. The output density data can be corrected for each LED element by detecting the quantity of light generated with a predetermined output density value.

Figure 10:
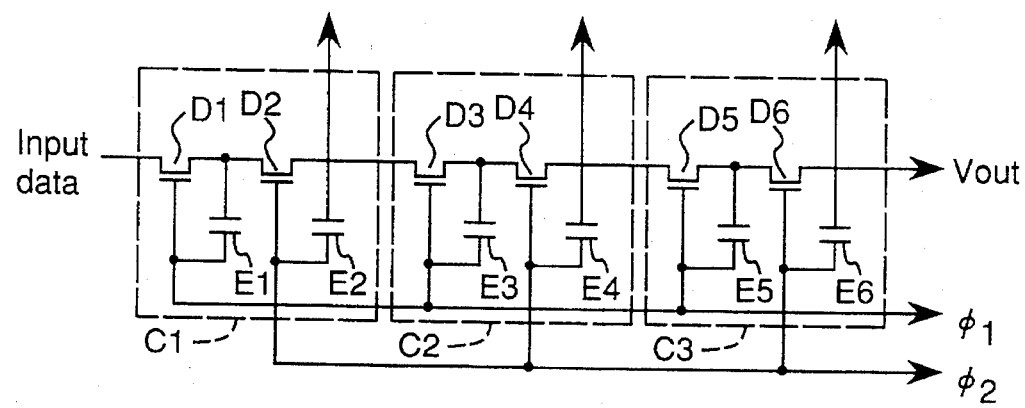
FIG. 10 is a part of an equivalent circuit of an analog shift register with BBD elements.

FIG. 10 shows a part of an equivalent circuit of an analog shift register comprising BBD elements which can be used instead of the above-mentioned analog shift register comprising CCD elements. Reference signs "D1"–"D6" denote transistors and "E1"–"E6" denote capacitors. Each element "C1"–"C3" of a bit comprises two transistors and two capacitors, and the structure of a BBD element is similar to that of a prior art BBD element. Each bit of the analog shift register is connected in parallel to a sample and hold circuit, while it is transferred serially to the next analog shift register. The relation of clock signals φ1 and φ2 is similar to that shown in FIG. 8 for the CCD elements.

This analog shift register can be used both for intensity modulation and for emission time (pulse width) modulation. In a shutter array (to control transmittance) or the like wherein signals of a certain level or more are needed, a driver is used which can control the time according to the voltage.

As explained above, because an analog shift register is used for a print head, a line of analog voltage levels for multi-level data of images can be outputted simultaneously and the intensity or driving time of optical output of each element in a print head can be controlled easily. Thus, a multi-level output of a print head can be realized. Further, previously, a new print head is heeded to be prepared when a resolution is changed. However, in this embodiment, the resolution is high and the resolution can be changed within the maximum resolution.

Second Embodiment

In this embodiment, two or more analog shift registers are used. An analog shift register receives a line of image data, while the other controls the quantity of light according to data of a previous line latched already.

Figure 11:
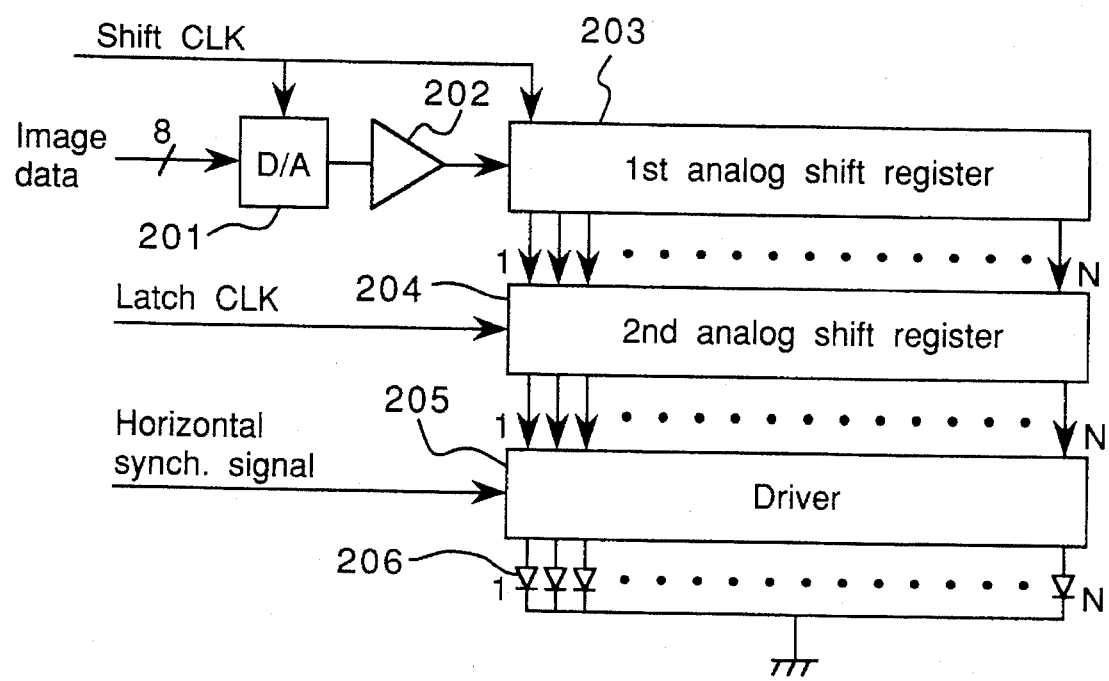
FIG. 11 ms a block diagram of an LED print head of a second embodiment.

As shown in FIG. 11, a D/A converter 201 converts a multi-level digital image data to an analog signal for each pixel, and an amplifier 202 amplifies the analog signal. A first analog shift register 203 shifts the amplified analog signals in the unit of pixel serially and registers them. A second analog shift register 204 receives and latches the analog signals of a line held by the first analog shift register 203 in parallel in synchronization of latch clock signal. A driver 205 drives an LED array 206 according to the analog signals in synchronization with a horizontal synchronization signal and controls the quantity of light generated by LED elements in the LED array 206. The LED array 206 is driven according to the data of a line latched in parallel by the second analog shift register 204 while the first analog shift register 203 receives successively image data of a next line. The driver 205 controls the quantity of light (intensity modulation) or the light emission time (time modulation).

Third Embodiment

In order to use an LED head with an analog shift register for reproducing a multi-level image, it is necessary to correct the scattering of the outputs of the light-emitting elements due to the analog shift register. Further, the shift efficiency of an analog shift register changes with shift times even for a same input voltage, and the shift efficiency itself also scatters among the light-emitting elements of the analog shift registers. Therefore, shading scattering occurs as in a CCD sensor.

In this embodiment, this scattering of the output of an analog shift register used in a print head is corrected. Factors of the scattering include a dark current and a transfer efficiency. The dark current is like a noise generated for each bit, and the amount of dark current differs for each bit. The dark current is accumulated in a capacitor of shift register, and the amount is proportional to time. Therefore, the dark current becomes smaller if the transfer rate of the data transfer is increased. Further, the transfer efficiency relates to the loss of charges when the charges are transferred from a bit to an adjacent bit in an analog shift register, and it differs for each bit.

Figure 12:
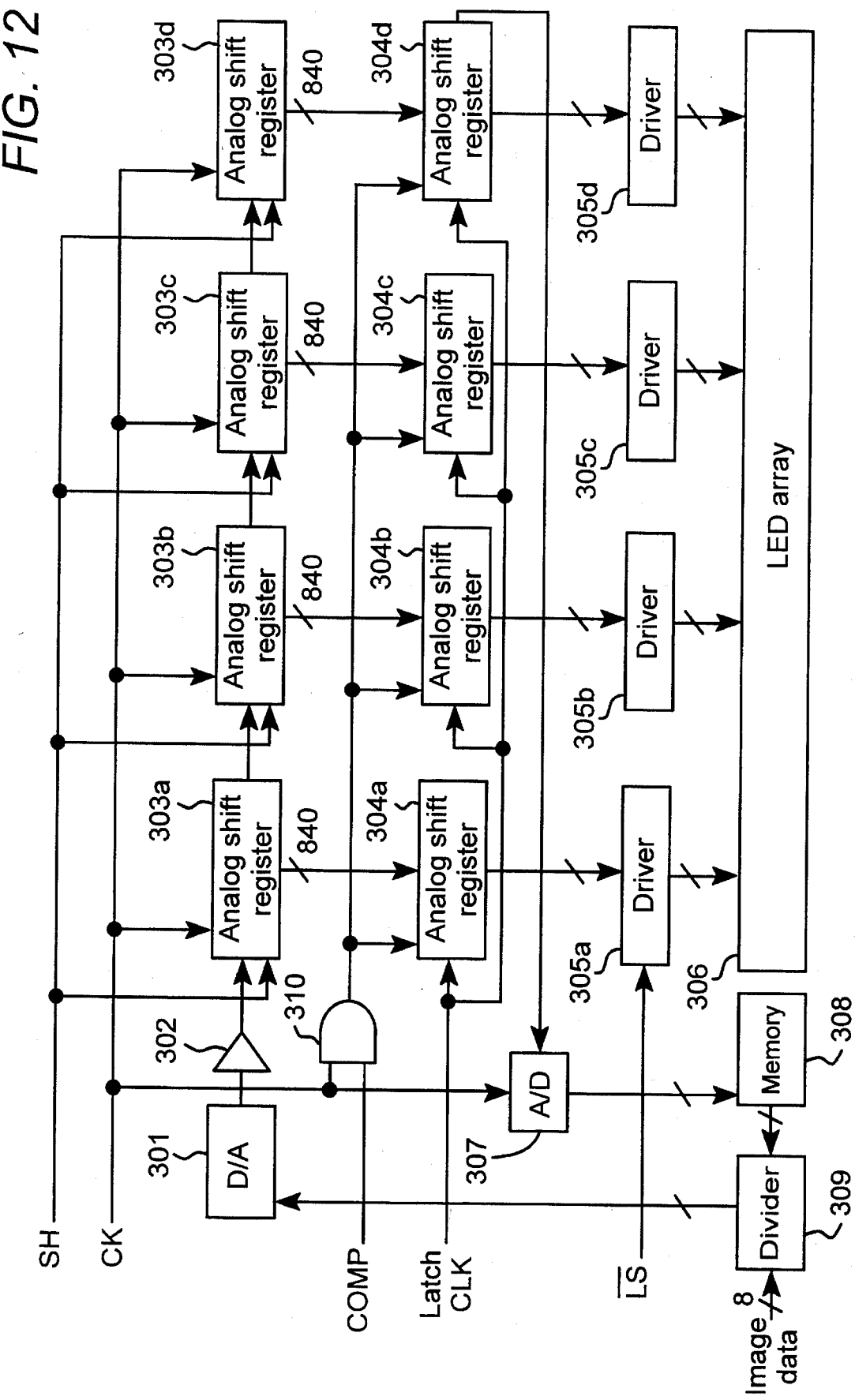
FIG. 12 is a block diagram of an LED print head of a third embodiment.

The correction for the scattering can be processed more easily with a digital circuit. Then, as shown in FIG. 12, an LED print head comprises two analog shift registers. First analog shift registers 303a–303d receive image data of a line successively, as in the second Embodiment. Second analog shift registers 304a–304d latches the analog signals of a line for driving an LED array and uses the latched data for correcting the scattering.

The circuit for correction comprises an A/D converter 307 for converting an analog value to a digital value, a line memory 308 for storing the digital value, a divider 309 for dividing an image data with the value of the line memory 308, and an AND gate 310.

Figure 13:
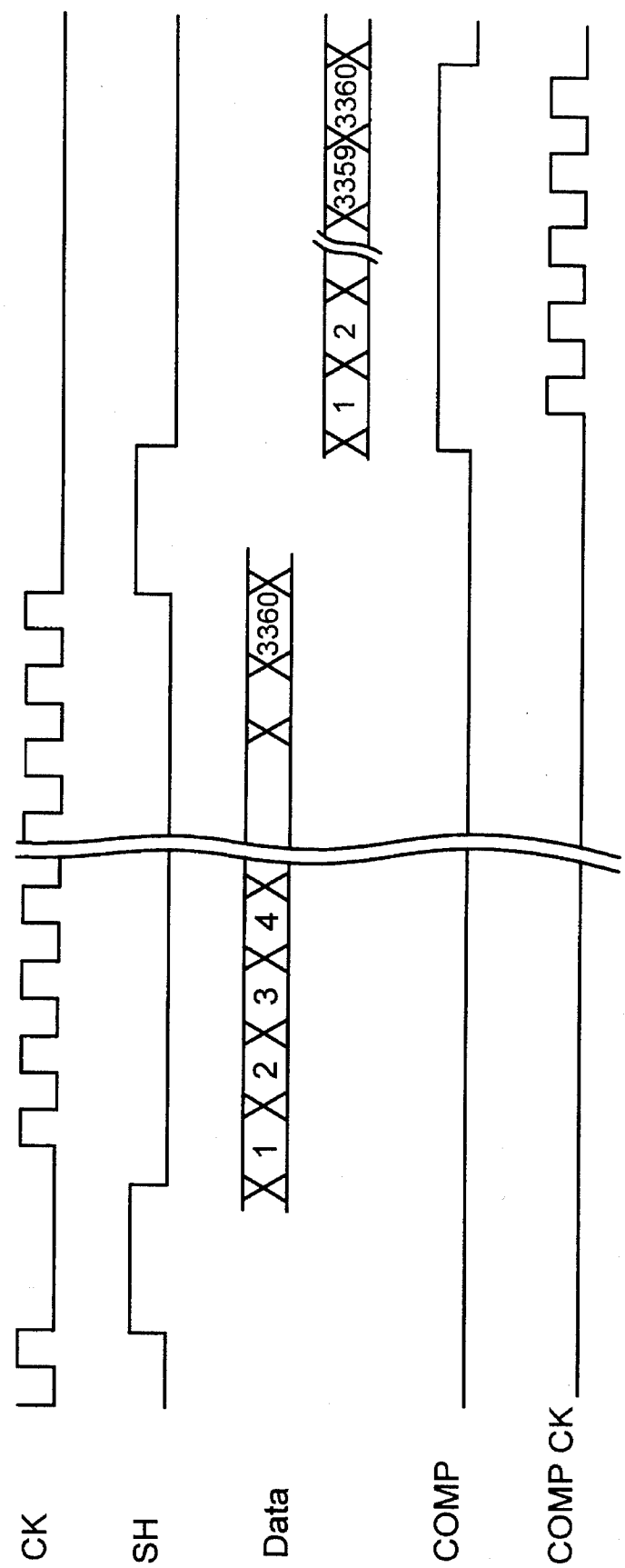
FIG. 13 is a timing chart of the LED print head on correction.
Figure 14:
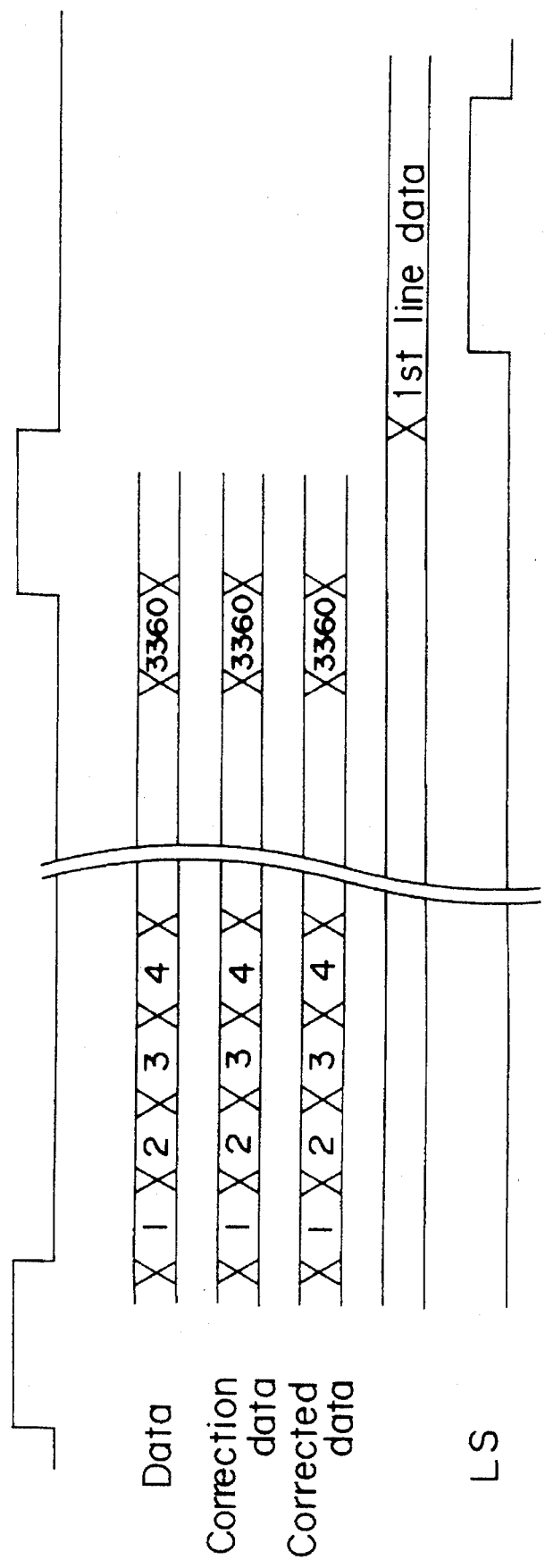
FIG. 14 is a timing chart of the LED print head on recording.

FIGS. 13 and 14 are timing charts of LED head on correction and on recording, respectively. Data for correction are obtained as explained below. As shown in FIG. 13, first, a reference data is inputted through a divider 309 to a D/A converter 301 to convert it to an analog signal. The analog signal is supplied through an amplifier 302 to four first analog shift registers 303a–303d connected in series. Data are shifted serially according to CK pulses in the first analog shift registers 303a–303d. Thus, data of a line (3,360 pixels) are registered. Next, data of a line is supplied to second analog shift registers 304a–304d and latched in them.

Next, when a COMP signal becomes the high level and a clock signal COMPCK is supplied to the second analog shift registers 301a–304d in synchronization of CK signal. The second analog shift registers 304a–304d shift data serially to send the data to the A/D converter 307, which digitalize the input analog signal. The digital data is stored in the line memory 308 having a capacity of a line of digital data. Thus, signals of a line (3,360 pixels) obtained on the same reference value are held as data for correction in the line memory 308. These data for correction are affected by the scattering of the first and second analog shift registers 303 and 304. When the data for correction are generated, the LS signal for the drivers 305a–305d is kept the low level. Therefore, image signals are not supplied to drivers 305a–305d.

As shown in FIG. 14, when actual data is printed, the data for correction are read from the line memory 308 in synchronization of the input of image data, and the image data is divided with the data for correction by the divider 309. Thus, the scattering of analog shift register can be corrected. The corrected image data are converted to analog data by the D/A converter 301 and are supplied to the first analog shift registers 304a–304d. When data of a line (3,360 pixels) are shifted successively according to CK signals, an SH signal is generated to send the data of a line to the second analog shift registers 304a–304d. Next, an LS signal is generated to send the analog signals of each pixel to the drivers 305a–305d, which drive the LED array 306 of 3,360 LED elements with currents according to the data held in the second analog shift registers 304a–304d when the LS signal is the low level. This processing is repeated for each line of image data.

Thus, transfer loss or scattering of data due to the shift and latch of analog shift register can be corrected easily, and a correct analog output can be obtained from input image data.

As explained above, the LED signal is controlled so that the light emission intensity is modulated according to the analog signal. However, as shown in the timing chart on a pixel in FIGS. 9(a) and 9(b), the pulse width may be modulated according to the analog signal under a constant light emission intensity. The pulse modulation may be performed in the unit of a dot (FIG. 9(a)) or two dots (FIG. 9(b)).

Fourth Embodiment

As explained above in the third embodiment, in an analog shift register, the transfer efficiency varies with shift, and the output voltage lowers according to shift times even for the same input voltage. Further, the transfer efficiency scatters among the elements in the analog shift register. Then, initial setting mode is provided in this embodiment. In the initial setting mode, before printing an image, a reference voltage is shifted by the number of the elements in an analog shift register and latched. Next, the gain of an amplifier to be connected next is controlled automatically by using the registered voltages so as to correct the loss in the shift latch processes. The automatic correction of the gain corrects the transfer loss and the scattering of signal charges due to shift latch, so that a correct output can be obtained according to input data. The initial setting mode is set for example for each image.

Figure 15:
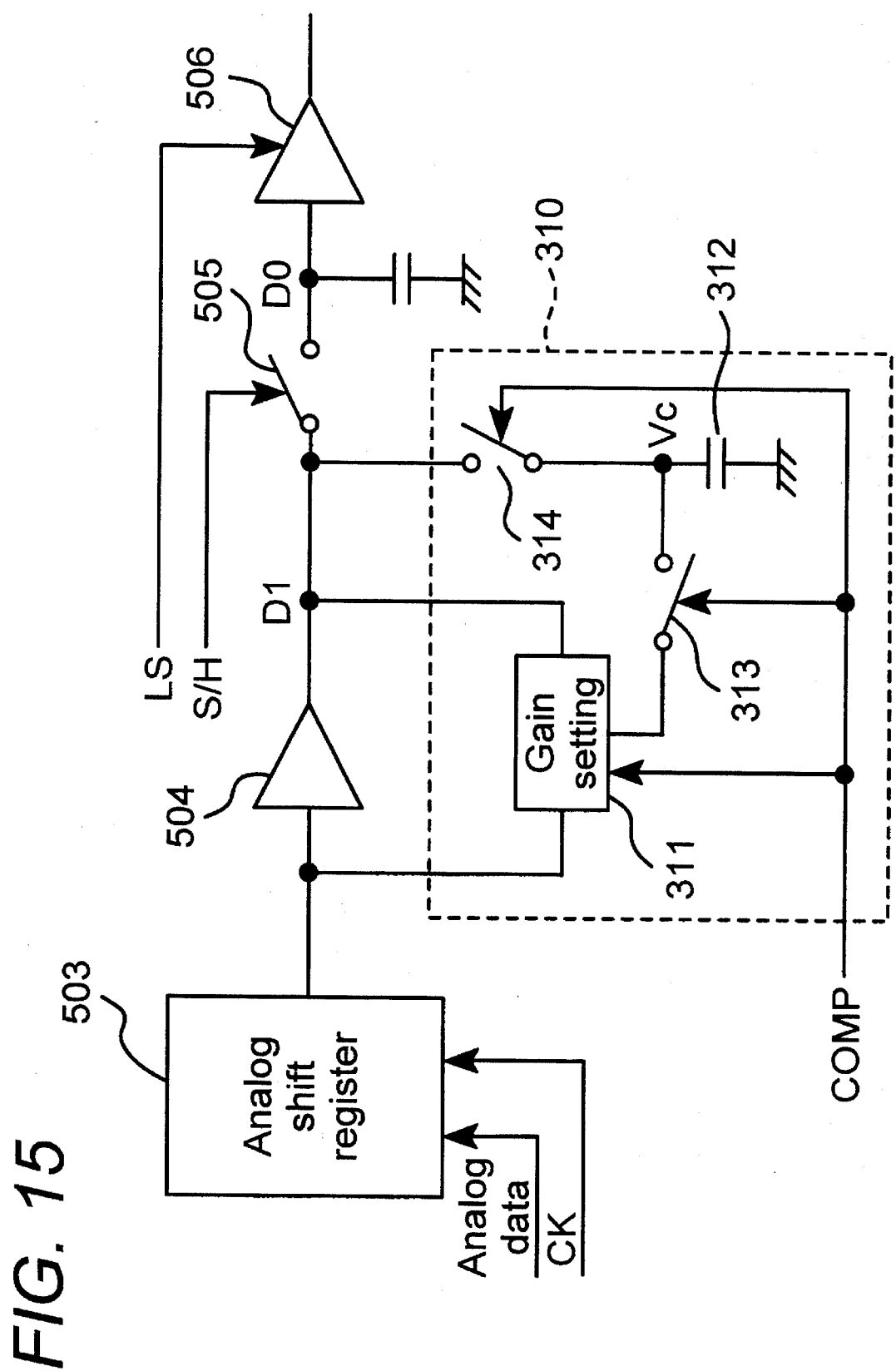
FIG. 15 is a block diagram of an LED print head of a fourth embodiment.

A print head shown in FIG. 15 comprises an analog shift register 503, an amplifier 504, an analog latch register (or sample and hold circuit) 505 and a driver 506, as a print head shown in FIG. 3. Further, the print head comprises a gain correction circuit 310 added for each pixel. For simplicity, a D/A converter, an amplifier and an LED array similar to those in FIG. 3 are not shown explicitly. A gain correction circuit 310 is connected in parallel to the amplifier 504. The gain setting circuit 311 comprises a transistor circuit which changes a resistance or current with voltage. Further, a capacitor 312 for setting a gain reference is connected through a switch 313 to the gain setting circuit 311 while connected through a switch 314 to an output terminal of the amplifier 504. A COMP signal is supplied to the gain setting circuit 311 and to the switches 313, 314.

Figure 16:
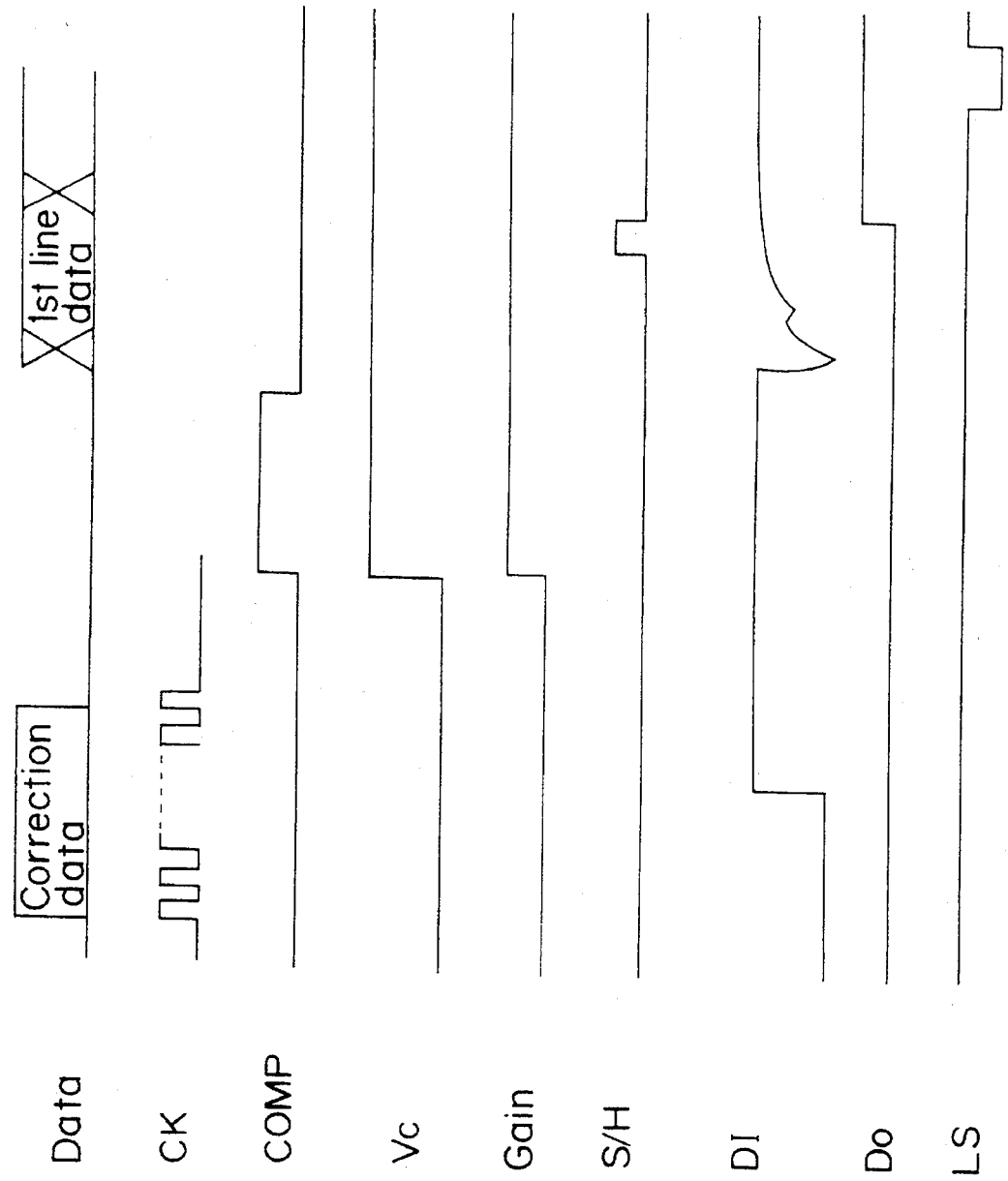
FIG. 16 ms a timing chart of gain correction.
Figure 17:
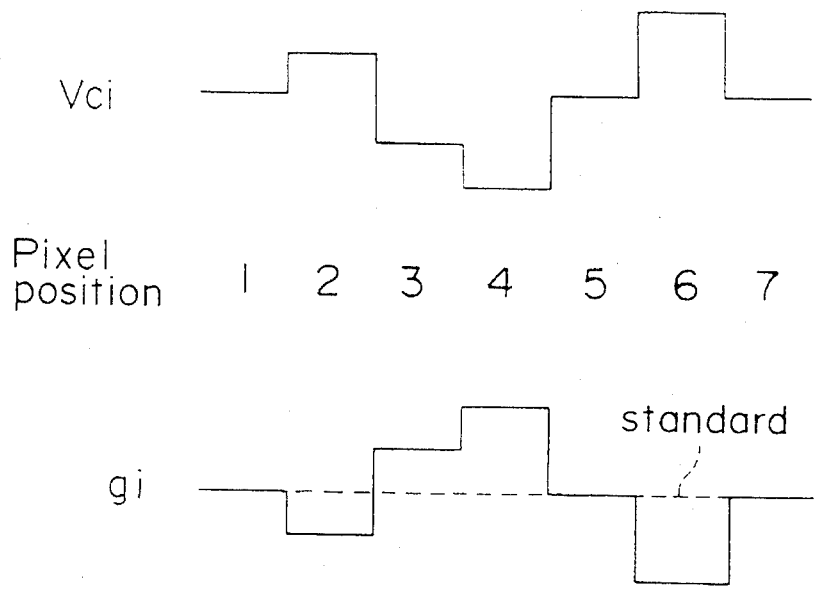
FIG. 17 is a diagram of $V_c$ and gain "g" for a pixel "i"

FIG. 16 shows a timing chart of gain correction, and FIG. 17 shows $V_c$ and a gain setting value "g" for an i-th pixel. As shown in FIG. 16, in the initial setting mode, reference data of a line (a maximum in this embodiment) are inputted to a data line. After the shift of the data of a line is completed and the reference data are stored in the analog shift register 503, a signal COMP for initial setting is changed to the high level. Thus, the switch 314 is closed and the voltage $V_c$ of the capacitor 312 for setting a gain reference is set according to the output signal "D1" of the amplifier 504. When the initial setting signal COMP is reset to be inactive, the switch 313 is closed and the gain changes according to the voltage $V_c$ in the gain setting circuit 311. That is, if $V_c$ is larger than the standard value, the gain setting circuit 311 decreases the gain of the amplifier 314. Thus, as shown in the lower part in FIG. 17, the gain changes from the standard value and the output is corrected to become constant.

Thus, image data are amplified correctly by the amplifier 504 and latched in the analog latch register 505. The driver 506 drives the LED elements (not shown) according to the analog signal held by the analog latch 505.

Fifth Embodiment

Figure 18A:
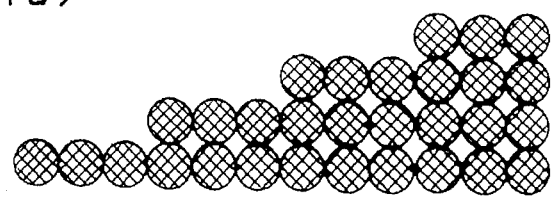
FIGS. 18(a), 18(b) and 18(c) are diagrams of a prior art image forming.
Figure 18B:
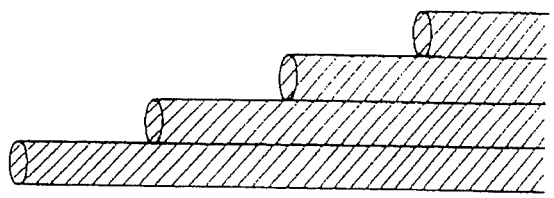
Figure 18C:
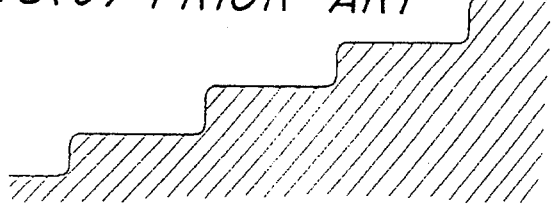

Because an LED print head has low gradation and an image formed with the LED print head includes discernible points due to steps of density expressed in the unit of dot. For example, FIG. 18(a) shows an example of print data of an image with a slope wherein the horizontal direction is the direction of main scan and the vertical direction is the direction of subscan. FIG. 18(b) shows scan lines formed with an LED array on the photoconductor according to the print data of FIG. 18(a). FIG. 18(c) shows an image formed on a paper from the image of FIG. 18(b). As shown in FIG. 18(c), it is clear that an image of a slope consists of steps discernible easily because an image consists of scan lines which are written or not in the unit of dot according to the print data. Thus, a coarse image is reproduced eventually.

In order to solve this problem, it is better to increase the resolution of printer to decrease the size of the steps. However, if the resolution is increased, there are problems such as the increase in cost due to the increase in the amount of data, the decrease in process speed, the increase in cost due to the increase in the number of LED elements in the LED head or heating.

Then, as shown in FIGS. 19(a)–19(c), an image of high quality can be obtained by using a smoothing control circuit without increasing the resolution while performing pulse width modulation or intensity modulation with an LED print head as shown in FIG. 3. FIG. 19(a) shows the same data as those shown in FIG. 18(a) wherein the horizontal direction is the direction of main scan and the vertical direction is the direction of subscan. FIGS. 19(b-1) and 19(b-2) show scan lines formed on the photoconductor in the pulse width modulation and in the intensity modulation, respectively. FIG. 19(c) shows an image printed on a paper. Thus, by controlling the light-emitting time or light intensity of a dot according to the converted data on the edges processed in an edge processor explained below, smoothing or control of a unit smaller than a dot can be carried out, and a high quality of image can be obtained.

Figure 20:
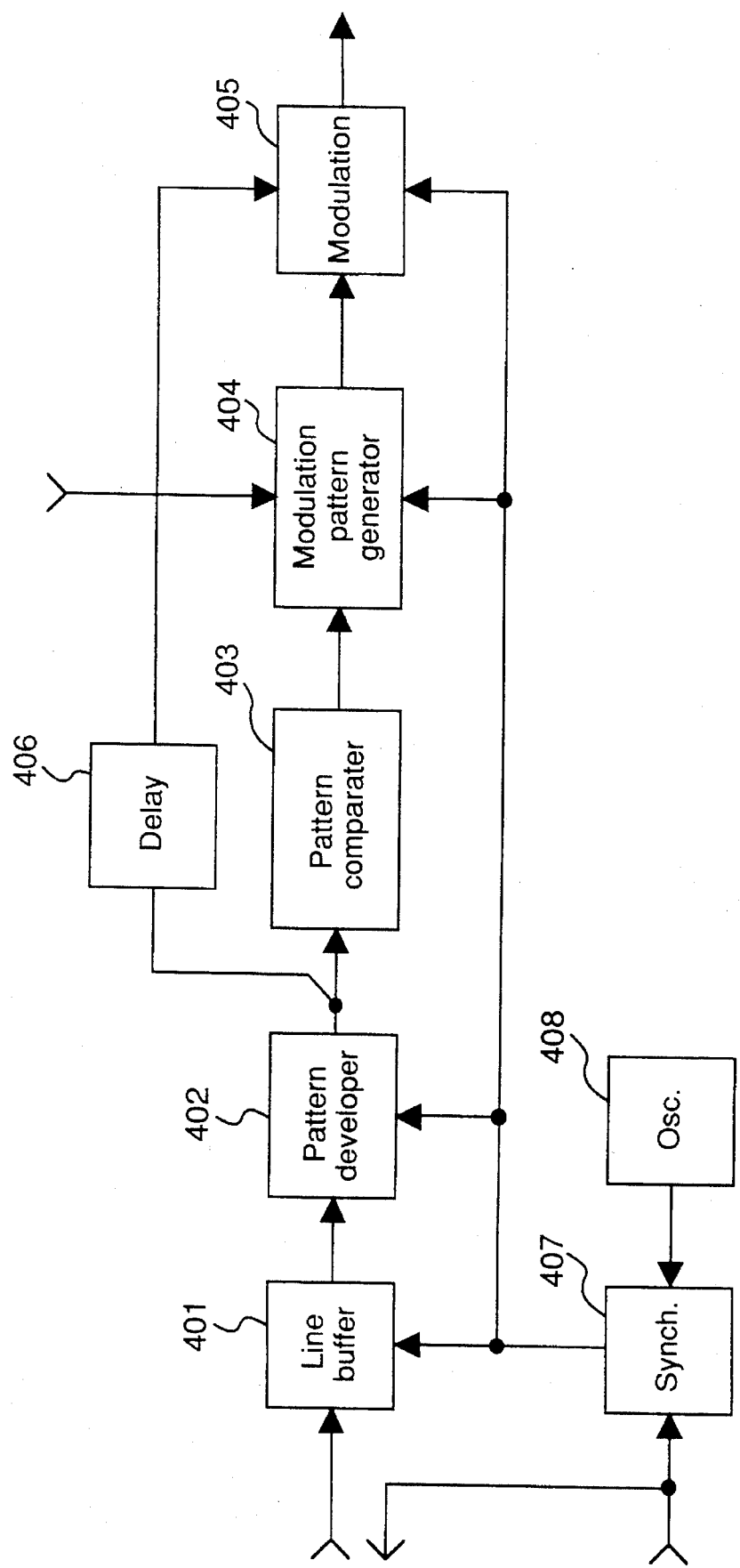
FIG. 20 is a block diagram of an edge processor.

FIG. 20 shows a block diagram of the edge processor which performs the above-mentioned control. The edge processor receives horizontal synchronization signals sent from the printer and bit image data sent synchronously with the horizontal synchronization signals and converts the edge portion in the data to an appropriate edge pattern according to selected modulation mode and sends the result to the LED head.

In the edge processor, a line buffer 401 stores receive image data of seven lines. A pattern developer 402 compiles data of a matrix of 7×11 dots for each dot for edge detection and pattern comparison. A pattern comparator 403 compares the pattern compiled in the pattern developer 402 with a plurality of predetermined patterns (refer FIGS. 21 and 22) and decides if an edge exists or what is the most appropriate edge pattern. A modulation pattern generator 404 generates a modulation pattern according to the codes of the most appropriate edge pattern and sends it to the modulation circuit 405. On the other hand, a delay circuit 406 delays the image data received from the pattern developer 402. The modulation circuit 405 comprises a switch and selects the modulation pattern from the modulation pattern generator 404 or the image data from the delay circuit 406 so as to replace edges in the original image data with the modulation pattern data. The modulation circuit 405 sends data to the LED head. A synchronization circuit 407 generates timing signals for controlling the data processor based on both oscillation signals generated by the oscillator 408 and horizontal synchronization signals.

Figure 21:
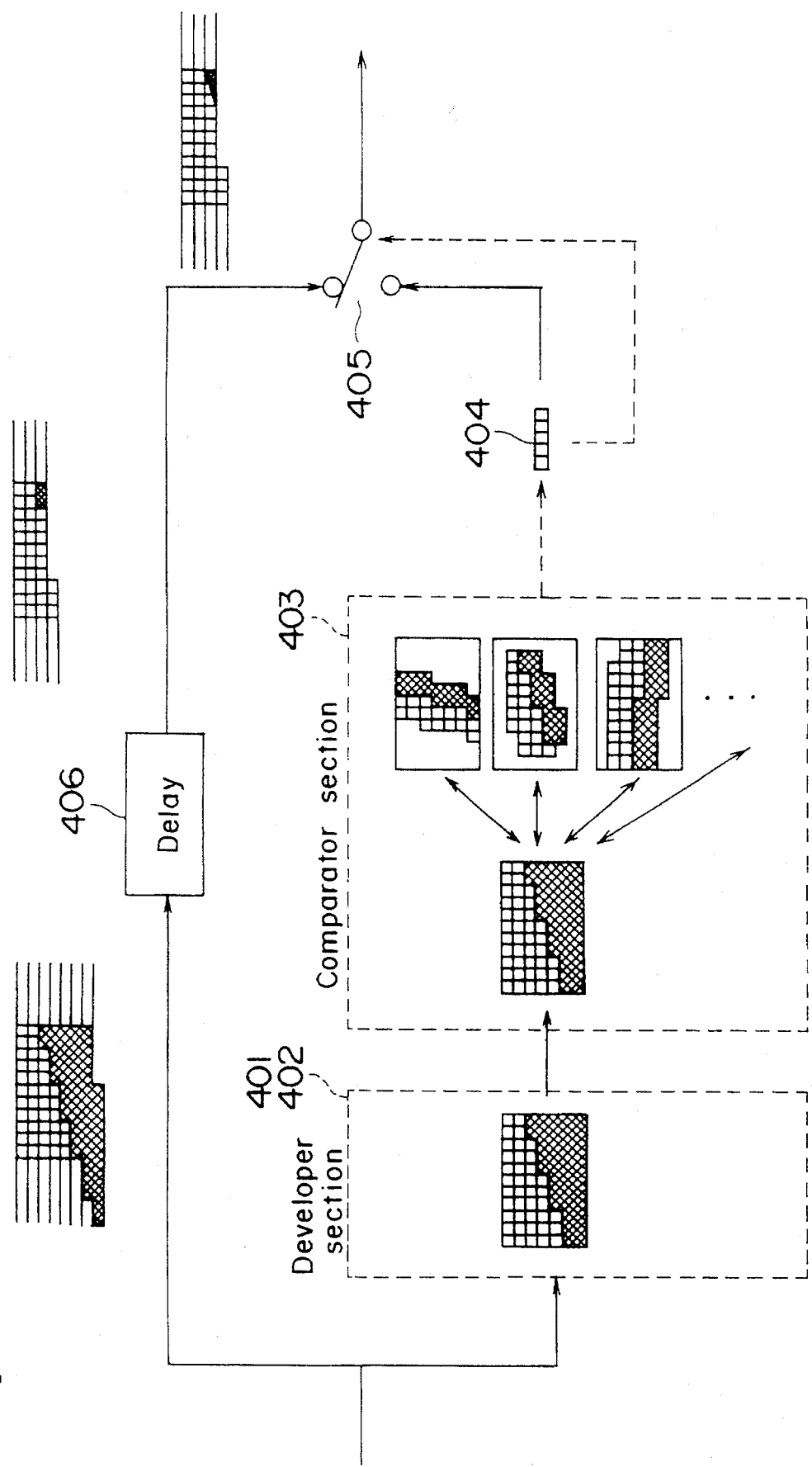
FIG. 21 is a diagram of a first processing in the edge processor.
Figure 22:
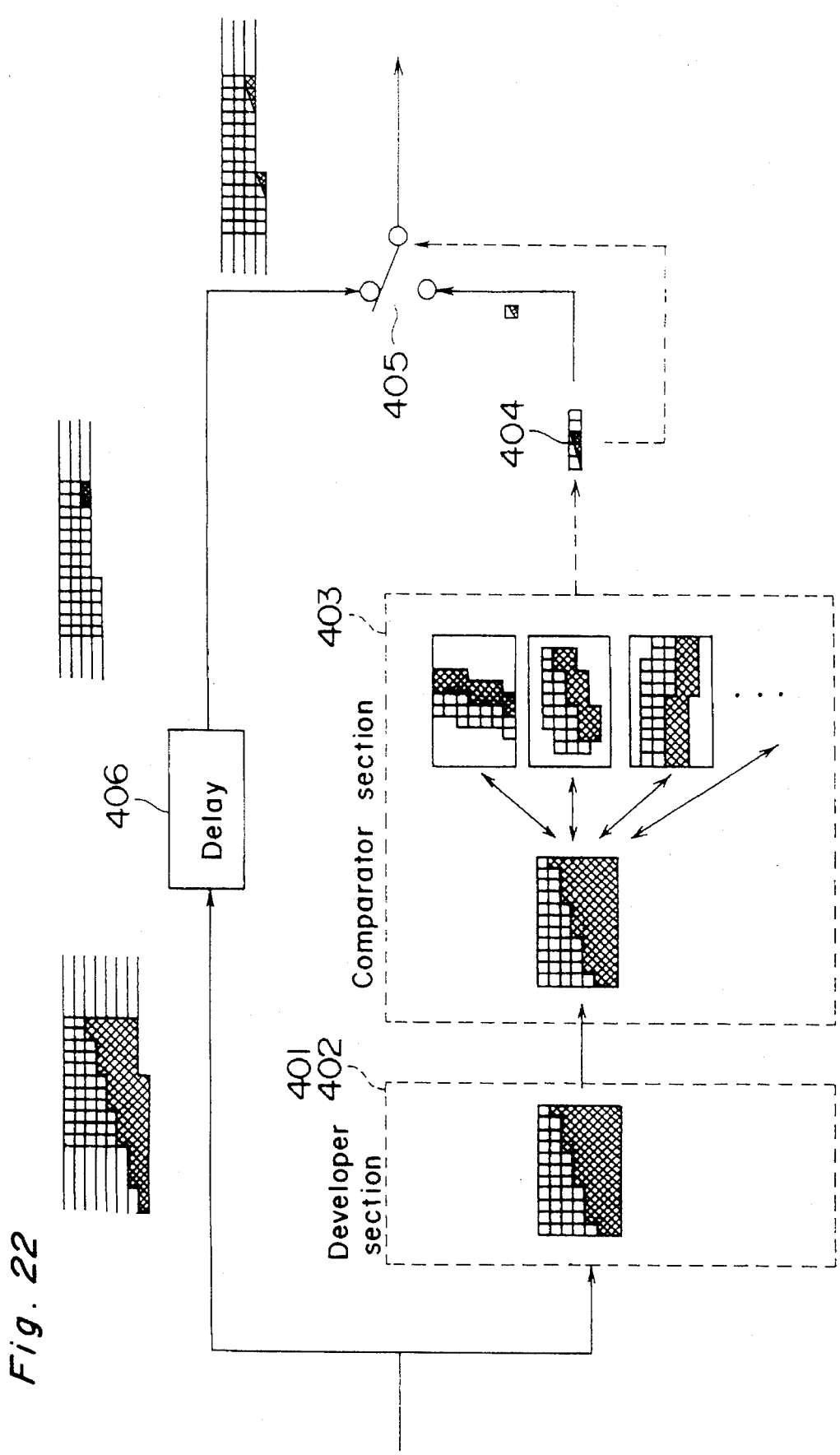
FIG. 22 is a diagram of a second processing in the edge processor.

FIGS. 21 and 22 illustrate two processing techniques in the edge processor for changing the pixel position or the pixel pattern for smoothing the steps in an image. As shown in FIG. 20, image data are processed in two parallel series. In the first series, edges in the input signals are detected to generate conversion patterns for the edges with the developer section 401, 402 and the comparator section 403. In the second series, the input signals are delayed by the delay circuit 406 in synchronization with the output of the conversion pattern. Either of the two signals becomes the input data for the modulation circuit 405. The modulation circuit 405 is controlled according to the modulation pattern stored in the pattern generator (memory) 404, and when conversion data for edges exist, the conversion data are sent through the modulation circuit 405.

In a state shown in FIG. 21, conversion data for edges are not stored in the pattern generator 404, so that the delayed signals are modulated to be sent to the LED print head. In FIG. 21, hatched areas designate black data and a slant hatch area designates a modulated portion which does not correspond to a complete dot.

On the other hand, in a state shown in FIG. 22, a pattern developed in the developer section 401, 402 is decided to be an edge by the comparator section 403, and a conversion pattern is stored in the pattern generator 404. Then, a signal on the existence of data is sent to the modulation circuit 405 which selects the input data from the pattern generator 404. Thus, the data stored in the pattern generator 404 is sent to the LED print head.

It is to be noted that this invention can be applied to a print head such as a liquid crystal shutter array, a PLZT array, an electroluminescence array, a plasma image bar, a fluorescent dot array, an ion jet array or a thermal head besides the LED head used in the above-mentioned embodiments.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A print head comprising:

a D/A converter which converts digital image data to analog signals, the digital image data comprising pixels, wherein each pixel of the digital image data comprises a plurality of bits representing an optical density of the pixel;

a first analog shift register which receives the analog signals from said D/A converter and which shifts the analog signals received from said D/A converter;

a second analog shift register which receives the analog signals from said first analog shift register and which holds a line of analog signals received from said first analog shift register;

an A/D converter which receives a serial shift output from said second analog shift register and which converts the serial shift output received from said second analog shift register to a digital signal when a standard value is input to said D/A converter;

a line memory which receives the digital signal from said A/D converter and which stores the digital signal;

a divider which receives the digital signal from said line memory and which receives digital image data and which divides the digital image data by the digital signal received from said line memory to produce corrected data and which sends the corrected data to said D/A converter, wherein after being converted by said D/A converter, the corrected data are transmitted to the first analog shift register, shifted in said first analog shift register, and held in said second analog shift register;

a light-emitting array comprising a line of light-emitting elements; and a driver which receives the corrected data from said second analog shift register and which drives the light-emitting elements in said light-emitting array according to the corrected data received from said second analog shift register.

2. The print head according to claim 1, wherein said light-emitting array is an LED array.

3. A print head comprising:

a D/A converter which converts digital image data to analog signals, the digital image data comprising pixels, wherein each pixel of the digital image data comprises a plurality of bits representing an optical density of the pixel;

an analog shift register which receives the analog signals from said D/A converter and which shifts the analog signals received from said D/A converter;

an amplifier which receives the analog signals from the analog shift register and which amplifies the analog signals received from said analog shift register;

a gain correction circuit connected in parallel with said amplifier, the gain correction circuit comprising:
- a sample and hold circuit which receives the analog signals from the amplifier and latches the analog signals received from the amplifier, and which samples and holds an output voltage of said amplifier when a standard voltage is input to said D/A converter before processing image data; and
- a gain setting circuit which adjusts a gain of said amplifier according to the output voltage held by the sample and hold circuit so that the output voltage of said amplifier becomes constant for each pixel when the standard voltage is input;

a light-emitting array comprising a line of light-emitting elements; and a driver which receives the analog signals from the sample and hold circuit and which drives said light-emitting elements in said light-emitting array according to the analog signals received from said sample and hold circuit.

4. The print head according to claim 3, wherein said light emitting array is an LED array.

* * * * *